(No Model.)

B. FORD.
PIPE JOINT PROTECTOR.

No. 320,771. Patented June 23, 1885.

Witnesses.
Alva A. Moore.
A. A. Connolly

Benjamin Ford
Inventor
by Connolly Brosom Tyler
Atty

United States Patent Office.

BENJAMIN FORD, OF PITTSBURG, PENNSYLVANIA, ASSIGNOR OF ONE-HALF TO JOHN D. FORD, OF SAME PLACE.

PIPE-JOINT PROTECTOR.

SPECIFICATION forming part of Letters Patent No. 320,771, dated June 23, 1885.

Application filed May 11, 1885. (No model.)

*To all whom it may concern:*

Be it known that I, BENJAMIN FORD, of Pittsburg, in the county of Allegheny and State of Pennsylvania, have invented certain new and useful Improvements in Pipe-Joint Protectors; and I do hereby declare that the following is a full, clear, and exact description of the invention, which will enable others skilled in the art to which it appertains to make and use the same, reference being had to the accompanying drawings, which form a part of this specification.

This invention has for its object the provision of a device adapted to be placed around the joints or couplings of pipes used for the conveyance of fluid under pressure, particularly those now used as pipe-lines for natural gas, to prevent any of the conduits of the pipe from leakage into the ground or air, which is a source of great danger to life and property. Numerous plans have been suggested which permit leakage at the joints, if there is any tendency, but aim to control such leakage and lead it off safely to the atmosphere. I aim to prevent the leakage once for all.

To this end my invention consists in a two-part metal flask or shell, with flanges and bolts or other means of connections, each part being shaped to approximate the exterior of the pipes and coupling-sleeve to be protected, and having a groove continuous in its face and concavity adapted to the application of a suitable continuous elastic packing, and in the combination and arrangement of parts, substantially as hereinafter fully described and claimed.

Figure 1:
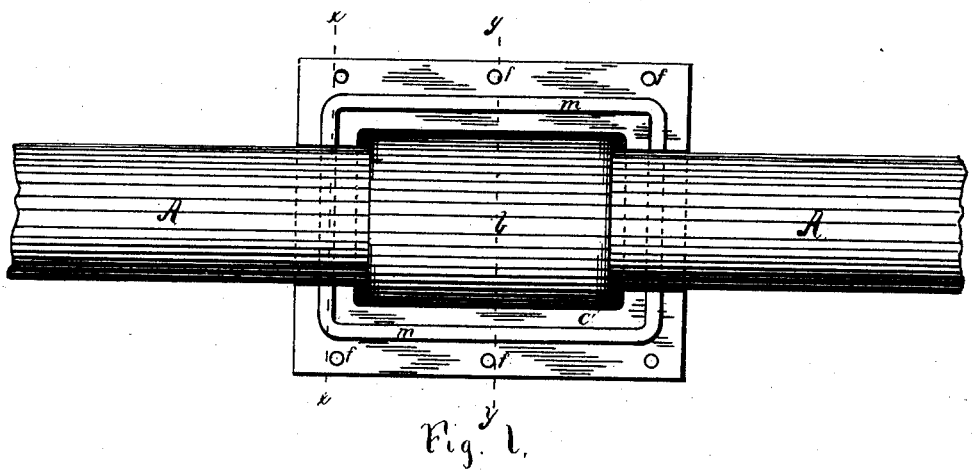
Figure 2:
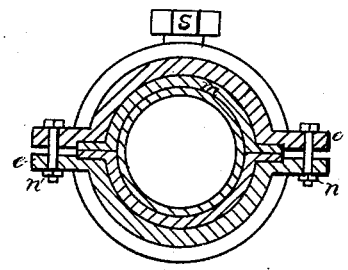
Figure 3:
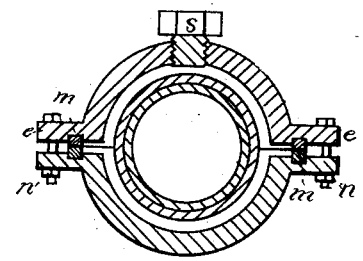
Figure 4:
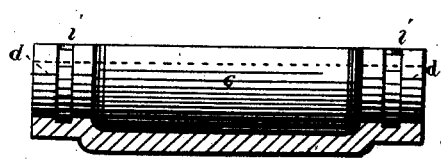

In the drawings, Figure 1 is a plan view of one of the two halves of my improvement, the pipes and coupling-sleeve being shown in position. Fig. 2 is a transverse section of the complete device on line $x\ x$. Fig. 3 is a similar view on line $y\ y$. Fig. 4 is a longitudinal section of the same.

A A are two sections of pipes, connected in any of the usual ways—such, for instance, as the plain threaded sleeve or socket $b$. I make two half-shells, preferably of cast-iron, with a central cavity, $c$, approximating in shape the socket $b$, but slightly larger, and the two contracted necks $d$ slightly larger than the pipes A, and the lateral flanges $e$ with a suitable number of bolt-holes, $f$. On the interior faces of each shell I form a continuous groove, $i$, which traverses the face lengthwise of each side of the cavity $c$ and part way of the neck $d$, and then crosses at the necks, following their concavity, as shown. Into the groove $i$ of each shell I press a gum, leather, or other elastic packing-strip, $m$, formed of a single strip. I then place the two halves around the pipe-joint, apply bolts $n$, and draw them together. This tightening compresses the packing $m$, and compels it to close every possible avenue of escape for such gas as might work through the joint proper, even if the joint itself were defective or broken. I thus secure the joint absolutely against leakage into the ground or atmosphere, and there will therefore be no necessity for a special conduit or escape device to carry away leaking gas. It is equally applicable to lines of pipe already laid and to new lines. I prefer to make the shell of cast-iron, and to enamel or otherwise coat the inner faces, or at least the face of grooves $i$, with a smooth and non-porous metallic or vitreous coating. With the groove enameled less force applied to the bolts will effectually confine the gas than if iron be merely left with its natural surface. I prefer, also, to make the necks $d$ and central cavity, $c$, somewhat larger than the parts they embrace, because by this construction a fair amount of lateral movement or warping can take place, due to expansion of the line or sinking of the ground, without destroying the perfection of the fit of the packing $m$.

The device is cheap, simple, and easy of application, and when applied is thoroughly effective, since the packing $m$ closes up all escape between them and the shells, and themselves meet together as tightly as may be desired. It will be observed that the packing $m$ not only closes up the space between the shell, but also surrounds the pipes A and prevents leakage there also.

In order to determine whether or not the device is securely applied, a screw-threaded opening may be left in the upper shell for the attachment of an air-pump and pressure-indicator. If not found tight, the bolts may be drawn till no escape occurs, after which a plug, s, is inserted to close the testing-vent. This vent may also be used for the admission of a sealing-liquid to cavity c to aid the packing.

I am aware that it is not new to form a covering for pipe-joints composed of two or more shells which embrace the ends of the pipes and have suitable packing between the meeting-points of said shells and around the ends of the same; but those which have been heretofore made have not been formed with a continuous groove and packing-strip, as described and claimed herein.

I claim as my invention—

1. A protector for pipe-couplings, composed of two concaved shells with enlarged central cavity adapted to embrace the coupling and contracted at each end, each shell having internally a continuous groove along its face and across the contracted ends, and making a complete circuit around the central cavity, in combination with a continuous packing-strip laid in said groove, and suitable means of clamping such shells upon the pipe-joint, substantially as described.

2. In a pipe-joint protector, the combination of two concaved sections adapted to be drawn together around the pipe-joint, each grooved continuously around on its inner face, and suitable continuous packing laid in said grooves, substantially as described.

3. The combination of the concaved shells having cavity c, necks d, flanges e, and grooves i continuous, as described, with a continuous packing, m, laid in said grooves, and suitable means of clamping said shells together, substantially as described.

In testimony that I claim the foregoing as my own I have hereto affixed my signature in presence of two witnesses.

BENJAMIN FORD.

Witnesses:
ALVA A. MOORE,
JNO. F. ATCHESON.